United States Patent
Han et al.

(10) Patent No.: US 10,745,500 B2
(45) Date of Patent: Aug. 18, 2020

(54) PREPARATION METHOD FOR ACRYLIC ACID-BASED POLYMER

(71) Applicant: LG Chem, Ltd., Seoul (KR)

(72) Inventors: Jung Sup Han, Daejeon (KR); Young Sam Kim, Daejeon (KR); Chang Bum Ko, Daejeon (KR); Dong Jo Ryu, Daejeon (KR); Im Gyu Kim, Daejeon (KR); Hyo Min Kim, Daejeon (KR)

(73) Assignee: LG Chem, Ltd. (KR)

( * ) Notice: Subject to any disclaimer, the term of this patent is extended or adjusted under 35 U.S.C. 154(b) by 25 days.

(21) Appl. No.: 15/765,005

(22) PCT Filed: Jan. 12, 2017

(86) PCT No.: PCT/KR2017/000411
§ 371 (c)(1),
(2) Date: Mar. 30, 2018

(87) PCT Pub. No.: WO2017/146374
PCT Pub. Date: Aug. 31, 2017

(65) Prior Publication Data
US 2018/0298126 A1    Oct. 18, 2018

(30) Foreign Application Priority Data
Feb. 24, 2016    (KR) .................. 10-2016-0022082

(51) Int. Cl.
| | | |
|---|---|---|
| C08F 120/06 | (2006.01) | |
| C08F 20/06 | (2006.01) | |
| C08F 2/48 | (2006.01) | |
| C08F 2/38 | (2006.01) | |
| C08F 220/06 | (2006.01) | |
| C08F 2/44 | (2006.01) | |
| C08F 2/00 | (2006.01) | |

(52) U.S. Cl.
CPC ............ *C08F 120/06* (2013.01); *C08F 2/001* (2013.01); *C08F 2/38* (2013.01); *C08F 2/44* (2013.01); *C08F 2/48* (2013.01); *C08F 20/06* (2013.01); *C08F 220/06* (2013.01)

(58) Field of Classification Search
USPC ........... 526/86, 87, 317.1, 930, 80; 522/182; 525/299, 301
See application file for complete search history.

(56) References Cited

U.S. PATENT DOCUMENTS

| | | | |
|---|---|---|---|
| 4,804,775 A | 2/1989 | Kamath et al. | |
| 5,266,646 A * | 11/1993 | Eisenhart ............. | A61K 8/8152 525/301 |
| 5,373,066 A | 12/1994 | Rebre et al. | |
| 6,444,760 B1 | 9/2002 | Rupaner et al. | |
| 6,462,138 B1 | 10/2002 | Rupaner et al. | |
| 8,003,210 B2 * | 8/2011 | Kobushi ................. | A61L 15/60 428/402 |
| 8,754,151 B2 * | 6/2014 | Roller .................. | C09D 141/00 524/458 |
| 2003/0027961 A1 | 2/2003 | Chmelir et al. | |
| 2003/0220410 A1 | 11/2003 | Heinis et al. | |
| 2006/0194055 A1 | 8/2006 | Matsuda et al. | |
| 2012/0157577 A1 | 6/2012 | Roller et al. | |
| 2012/0207696 A1 | 8/2012 | van Geel et al. | |
| 2013/0041117 A1 | 2/2013 | Hayashida et al. | |
| 2014/0088250 A1 | 3/2014 | Suau et al. | |
| 2015/0148500 A1 | 5/2015 | Fujiwara | |
| 2015/0203676 A1 | 7/2015 | Li | |
| 2017/0107313 A1 | 4/2017 | Murakami et al. | |

FOREIGN PATENT DOCUMENTS

| | | |
|---|---|---|
| CN | 1047322 A | 11/1990 |
| CN | 1113901 C | 7/2003 |
| CN | 101120038 A | 2/2008 |
| CN | 104640890 A | 5/2015 |
| EP | 1882701 A1 | 1/2008 |
| JP | H05078493 A | 3/1993 |
| JP | H06172418 A | 6/1994 |
| JP | H08005941 B2 | 1/1996 |
| JP | H10204108 A | 8/1998 |
| JP | 2000053719 A | 2/2000 |
| JP | 2001131207 A | 5/2001 |
| JP | 2001516775 A | 10/2001 |
| JP | 2002265390 A | 9/2002 |
| JP | 3357093 B2 | 12/2002 |
| JP | 2004035753 A | 2/2004 |
| JP | 2004043520 A | 2/2004 |

(Continued)

OTHER PUBLICATIONS

Extended European Search Report includng Written Opinion for Application No. 17756712.0 dated Oct. 12, 2018, 6 pages.
Schwalm, Reinhold, "UV Coatings: Basics, Recent Developments and New Applications", Elsevier Science, Dec. 21, 2006, p. 115.
Odian, George, "Principles of Polymerization", John Wiley and Sons, Inc. Oct. 1981, p. 203.
International Search Report for PCTKR2017000411 dated May 4, 2017.
Chinese Search Report for Application No. 201780003575.0 dated Nov. 13, 2019, 2 pages.

*Primary Examiner* — Fred M Teskin

(74) *Attorney, Agent, or Firm* — Lerner, David, Littenberg, Krumholz & Mentlik, LLP

(57) ABSTRACT

The present disclosure relates to a preparation method for an acrylic acid-based polymer. According to the preparation method for an acrylic acid-based polymer of the present disclosure, unreacted monomers may be reduced and a high quality acrylic acid-based polymer can be prepared. In addition, it is not necessary to increase the time or the temperature in the polymerization step or the aging step, thereby maintaining the high productivity.

7 Claims, No Drawings

(56) References Cited

FOREIGN PATENT DOCUMENTS

| | | | |
|---|---|---|---|
| JP | 2004143192 | A | 5/2004 |
| JP | 2004204088 | A | 7/2004 |
| JP | 2005255848 | A | 9/2005 |
| JP | 2007084831 | A | 4/2007 |
| JP | 2012116964 | A | 6/2012 |
| JP | 5027414 | B2 | 9/2012 |
| KR | 20010024093 | A | 3/2001 |
| KR | 20010032417 | A | 4/2001 |
| KR | 20030056031 | A | 7/2003 |
| KR | 100689598 | B1 | 2/2007 |
| KR | 20070060682 | A | 6/2007 |
| KR | 100793942 | B1 | 1/2008 |
| KR | 20100023340 | A | 3/2010 |
| KR | 101016925 | B1 | 2/2011 |
| KR | 20110040510 | A | 4/2011 |
| KR | 20130026526 | A | 3/2013 |
| KR | 101253814 | B1 | 4/2013 |
| KR | 20130040863 | A | 4/2013 |
| KR | 101275741 | B1 | 6/2013 |
| KR | 20140064747 | A | 5/2014 |
| KR | 20150035510 | A | 4/2015 |
| KR | 20150052361 | A | 5/2015 |
| WO | 2014040290 | A1 | 3/2014 |
| WO | 2016006133 | A1 | 1/2016 |

\* cited by examiner

PREPARATION METHOD FOR ACRYLIC ACID-BASED POLYMER

CROSS-REFERENCE TO RELATED APPLICATION

The present application is a national phase entry under 35 U.S.C. § 371 of International Application No. PCT/KR2017/000411, filed on Jan. 12, 2017, which claims the benefit of Korean Patent Application No. 10-2016-0022082, filed on Feb. 24, 2016 with the Korean Intellectual Property Office, the disclosures of which are incorporated herein by reference.

BACKGROUND OF THE INVENTION

(a) Field of the Invention

The present disclosure relates to a preparation method for an acrylic acid-based polymer. More specifically, it relates to a preparation method for an acrylic acid-based polymer capable of reducing the content of unreacted residual monomers.

(b) Description of the Related Art

Acrylic acid-based polymers are industrially important polymers used in a wide range of applications such as superabsorbent resins, adhesives, paints, cosmetics, dispersants and thickeners. A bulk polymerization method, an aqueous solution polymerization method and the same are known as the preparation method of the same.

Among them, the bulk polymerization method is difficult to control the reaction heat, because the reaction proceeds too violently. Therefore, the aqueous solution polymerization method which is easy to control the reaction heat and is environmentally friendly and relatively low in production cost by using water as a solvent is widely used.

The aqueous solution polymerization method includes a thermal polymerization method in which monomers are polymerized while breaking polymerization gel in a kneader having multiple axes and a photo polymerization method in which a high concentration aqueous solution is irradiated with ultraviolet rays or the like on a belt to perform polymerization and drying at the same time. The acrylic acid-based polymer obtained by the above-mentioned polymerization reaction is generally commercially available as a powdery product after being dried, and pulverized.

The step of polymerizing the monomer in the process of preparing such an acrylic acid-based polymer is an important step for determining the physical properties of the polymer.

In the process of the polymerization, continuous feeding and polymerization of the monomer composition are carried out. At this time, unpolymerized components resulted from the uncompleted polymerization depending on the rate of the polymerization reaction of the monomer composition, that is, unreacted monomers may remain. If the unreacted monomers remain in the polymer, the physical properties of the polymer are deteriorated and cause a bad smell. In order to solve this problem, there is a technique of extending the polymerization time or aging time of the monomer composition solution or raising the polymerization temperature, but in this case, the process becomes complicated and the process time is increased, thereby lowering the productivity.

SUMMARY OF THE INVENTION

In order to solve the above problems, the present disclosure is to provide a preparation method for an acrylic acid-based polymer capable of improving the quality of the final polymer by reducing the unreacted monomers without deteriorating the productivity.

In order to achieve the above object, the present disclosure provides a preparation method for an acrylic acid-based polymer, including the steps of:

feeding a monomer composition comprising a first acrylic acid-based monomer, and a first polymerization initiator into a polymerization reactor;

polymerizing the monomer composition; and adding a second acrylic acid-based monomer, and a second polymerization initiator into the polymerization reactor after the feeding of the monomer composition is completed, and leaving them.

According to the preparation method for an acrylic acid-based polymer of the present disclosure, an acrylic acid-based polymer of high quality can be prepared, because the unreacted monomers are reduced.

In addition, according to the preparation method for an acrylic acid-based polymer of the present disclosure, the productivity can be maintained high, because it is not necessary to increase the time or the temperature in the polymerization step or the aging step.

DETAILED DESCRIPTION OF THE EMBODIMENTS

The present invention can be variously modified and have various forms, and specific examples of the present invention are explained in this description. However, it is not intended to limit the present invention to the specific examples and it must be understood that the present invention includes every modifications, equivalents, or replacements included in the idea and technical scope of the present invention.

Hereinafter, the preparation method for an acrylic acid-based polymer according to the exemplary embodiments of the present disclosure will be described in more detail.

The preparation method for an acrylic acid-based polymer of the present disclosure includes the steps of:

feeding a monomer composition comprising a first acrylic acid-based monomer, and a first polymerization initiator into a polymerization reactor;

polymerizing the monomer composition; and adding a second acrylic acid-based monomer, and a second polymerization initiator into the polymerization reactor after the feeding of the monomer composition is completed, and leaving them.

In the present disclosure, the acrylic acid-based polymer is referred to as including both a polymer of (meth)acrylic acid and a copolymer obtained by polymerizing (meth)acrylic acid as a main monomer and another comonomer together.

In the preparation method for an acrylic acid-based polymer of the present disclosure, the raw material of the acrylic acid-based polymer includes a first acrylic acid-based monomer and a first polymerization initiator.

The first acrylic acid-based monomer may be acrylic acid, methacrylic acid, methyl methacrylate, or a salt thereof, which is usually used in the preparation of an acrylic acid-based polymer, and one or more of these may be used in combination.

More specifically, acrylic acid or a salt thereof, for example, an alkali metal salt such as an acrylic acid or a sodium salt thereof can be used. By using the monomer, it is possible to prepare an acrylic acid-based polymer having excellent physical properties. When the alkali metal salt of acrylic acid is used as a monomer, the acrylic acid may be used after neutralizing with a basic compound such as sodium hydroxide (NaOH).

The concentration of the first acrylic acid-based monomer is not particularly limited, but may be about 20 to about 60 wt %, preferably about 40 to about 50 wt %, based on the monomer composition including the raw material of the acrylic acid-based polymer and the solvent. And, it may be an appropriate concentration considering the purpose, the polymerization time, and the reaction conditions. However, if the concentration of the monomer is excessively low, the yield of the acrylic acid-based polymer may be lowered and it may not be economical. In contrast, if the concentration is excessively high, it may cause problems in processes that some of the monomers are extracted or the pulverization efficiency of the prepared hydrogel polymer appears low in the pulverizing process, and thus the physical properties of the acrylic acid-based polymer may be deteriorated.

In the preparation method for an acrylic acid-based polymer according to the present disclosure, the first polymerization initiator used during the polymerization is not particularly limited, as long as it is generally used in the preparation of the acrylic acid-based polymer.

Specifically, the first polymerization initiator may use a thermal polymerization initiator or a photo polymerization initiator by UV irradiation, depending on the polymerization method. However, even in the case of using the photo polymerization method, a thermal polymerization initiator may be additionally included, because a certain amount of heat is generated by the ultraviolet irradiation or the like and a certain degree of heat is generated according to the progress of the exothermic polymerization reaction.

The photo polymerization initiator can be used without any limitation, as long as it is a compound capable of forming a radical by a light such as an UV ray.

The photo polymerization initiator, for example, may include one or more initiators selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide. More various photo polymerization initiators are well disclosed in "UV Coatings: Basics, Recent Developments and New Application(Elsevier 2007년)" written by Reinhold Schwalm, (Elsevier, 2007), p 115, however the photo polymerization initiator is not limited thereto.

The first photo polymerization initiator may be included in the concentration of about 0.01 to about 1.0 wt % based on the monomer composition. If the concentration of the photo polymerization initiator is excessively low, the polymerization rate may become slow, and if the concentration of the photo polymerization initiator is excessively high, the molecular weight of the polymer may become small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like; and examples of the azo-based initiator may include 2,2-azobis(2-amidinopropane) dihydrochloride, 2,2-azobis-(N, N-dimethylene)isobutyramidine dihydrochloride, 2-(carbamoylazo)isobutylonitril, 22,2-azobis [2-(2-imidazolin-2-yl)propane] dihydrochloride, 4,4-azobis-(4-cyanovaleric acid) and the like. More various thermal polymerization initiators are well disclosed in 'Principle of Polymerization(Wiley, 1981)' written by Odian, (Wiley, 1981), p 203, however the thermal polymerization initiator is not limited thereto.

The thermal polymerization initiator can be included in the concentration of about 0.001 to about 0.5 wt % based on the monomer composition. If the concentration of the thermal polymerization initiator is excessively low, the additional thermal polymerization hardly occurs and thus effects due to the addition of the thermal polymerization initiator may be insignificant. And, if the concentration of the thermal polymerization initiator is excessively high, the molecular weight of the polymer may become small and the physical properties may become uneven.

In the preparation method of the present disclosure, the monomer composition of the acrylic acid-based polymer may further include additives such as a thickener, a plasticizer, a preservation stabilizer, an antioxidant, and the like, as needed.

The raw materials such as the first acrylic acid-based monomer, the first polymerization initiator, and the additives may be prepared in the form of the monomer composition solution which is dissolved in a solvent.

In this case, the solvent can be used without any limitation, as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and the like may be used alone or in combination with each other.

The solvent may be included in a residual amount of excluding the above-described components from the total weight of the monomer composition.

Meanwhile, the method for preparing a polymer by the thermal polymerization or photo polymerization of the monomer composition is not particularly limited, as long as it is a method typically used in the art.

Specifically, the polymerization method is largely classified into a thermal polymerization and a photo polymerization depending on the polymerization energy source. The thermal polymerization may be typically carried out in a reactor like a kneader equipped with agitating spindles, and the photo polymerization may be carried out in a reactor equipped with a movable conveyor belt. However, the above-described polymerization method is an example only, and the present disclosure is not limited thereto.

According to the embodiments of the present disclosure, the step of feeding a monomer composition into a polymerization reactor and the step of polymerizing the monomer composition may be carried out substantially simultaneously. That is, thermal polymerization and/or photo polymerization are simultaneously carried out for the monomer composition while the monomer composition is continuously introduced into the polymerization reactor.

Subsequently, after the feeding of the monomer composition is completed, a second acrylic acid-based monomer, and a second polymerization initiator are added into the polymerization reactor.

During the continuous feeding and polymerization of the monomer composition in the previous step, the first acrylic acid-based monomer contained in the monomer composition is thermally polymerized and/or photo polymerized to form a hydrogel polymer. In a general preparation method for an acrylic acid-based polymer, after the feeding of the monomer composition is completed, the monomer composition is maintained as it is for a certain amount of time. This is referred to as an aging step. Since the polymerization reaction of the acrylic acid-based monomer is an exothermic reaction, a certain amount of heat is generated as the polymerization reaction progresses, and the polymerization reaction can be continued without further supply of light and/or heat in this aging step. However, it is also possible to supply continuous light and/or heat in the aging step.

Generally, among the first acrylic acid-based monomer contained in the monomer composition, a certain amount of remaining monomers not participating in the polymerization reaction, for example, about 1,000 to about 30,000 ppm, are generated. If the unreacted monomers remain in the final polymer in large amounts, it may not only affect the physical properties of the polymer such as absorbency and liquid permeability, but also cause odors and irritation to the skin. Therefore, a method for reducing the unreacted monomers is needed.

As the method for reducing the unreacted monomers, first, a method of increasing the supply of energy such as extending the time in the polymerization step or the aging step or raising the temperature, secondly, a method of increasing the content of the polymerization initiator, third, a method of removing the unreacted monomers by a pressure reduction process and the like after the polymerization are known. The first method is not preferable, because productivity is lowered due to increased energy consumption, while the unreacted monomers are not significantly reduced. By using the second method, the unreacted monomers can be reduced, but at the same time, the molecular weight of the polymer is also reduced, making it difficult to obtain a polymer having a desired molecular weight. According to the third method, when the polymer composition has a high viscosity, it is difficult to effectively remove the unreacted monomers, and the number of processes increases, resulting in a decrease in productivity.

Thus, the present inventors have completed the present invention in consideration of the fact that the unreacted monomers can be remarkably reduced without additional time or energy by additionally feeding the acrylic acid-based monomer and the polymerization initiator in the aging step after the feeding of the monomer composition is completed.

More specifically, after the feeding of the monomer composition including the first acrylic acid-based monomer and the first polymerization initiator into the polymerization reactor is completed, a second acrylic acid-based monomer and a second polymerization initiator are further added into the polymerization reactor. Here, the description of the second acrylic acid-based monomer is the same as that of the first acrylic acid-based monomer, and the same or different materials may be used. Also, the description of the second polymerization initiator is the same as that of the first polymerization initiator, and the same or different materials may be used.

According to an embodiment of the present disclosure, the content of the second acrylic acid-based monomer may be about 1 to about 10 parts by weight, or 1 to about 5 parts by weight based on 100 parts by weight of the first acrylic acid-based monomer. If the content of the second acrylic acid-based monomer is out of the above range, too little or too much, the effect of reducing unreacted monomers may be deteriorated.

In addition, according to an embodiment of the present disclosure, the content of the second polymerization initiator may be about 0.01 to about 0.2 parts by weight based on 100 parts by weight of the first acrylic acid-based monomer. If the content of the second polymerization initiator is too little or too much, the effect of reducing unreacted monomers may be deteriorated.

It is preferable that the second acrylic acid-based monomer and the second polymerization initiator are added into the polymerization reactor within 5 minutes after the continuous feeding of the monomer composition is completed. If the addition of the second acrylic acid-based monomer and the second polymerization initiator is carried out earlier or later than that, the effect of reducing unreacted monomers may be deteriorated.

According to an embodiment of the present disclosure, when the addition of the second acrylic acid-based monomer and the second polymerization initiator is completed, it may be aged by being left for about 1 to about 10 hours, preferably about 1 to about 5 hours. If the step of leaving is too short, the additional polymerization reaction may not be sufficiently carried out. And, if the step of leaving is too long, productivity may not be desirable.

In addition, according to an embodiment of the present disclosure, the aging step may maintain the temperature of about 60 to about 90° C., preferably about 70 to about 80° C. If the temperature is too low, the polymerization reaction may not be sufficiently carried out, and if the temperature is too high, energy consumption may become large, thereby lowering the productivity.

In the aging step, as the polymerization reaction of the unreacted monomers in the first acrylic acid-based monomer and the additionally added second acrylic acid-based monomer continues, a polymer in which unreacted monomers are significantly reduced can be obtained as compared with the case where the second acrylic acid-based monomer and the second polymerization initiator are not further added.

According to an embodiment of the present disclosure, about 96 wt % to about 99 wt % of the unreacted monomers may be reduced as compared with the case where the second acrylic acid-based monomer and the second polymerization initiator are not further added, while the other processing conditions are the same. In addition, about 75 wt % to about 95 wt % of the unreacted monomers may be reduced as compared with the case where only the second polymerization initiator are further added without the second acrylic acid-based monomer.

As described above, the acrylic acid-based polymer obtained according to the preparation method of the present disclosure may have very a low content of residual monomers, about 700 ppm or less, or about 500 ppm or less, or about 400 ppm or less. There is no specific lower limit, because the lower content of the monomer can be evaluated as the better, and it is 0 ppm or more.

The polymer of the present disclosure obtained by the above-mentioned method can be subjected to a process of a conventional preparation method for an acrylic acid-based polymer suitable for the intended use.

For example, when the acrylic acid-based polymer is used as a super absorbent polymer (SAP), final products can be obtained through processes such as drying, pulverization, classification, surface crosslinking, and the like.

Hereinafter, the function and effect of the present invention will be described in more detail through specific examples of the present invention. However, these examples are for illustrative purposes only, and the invention is not intended to be limited by these examples.

EXAMPLES

Example 1

300 g of water was added to a 1 L glass reactor equipped with a thermometer, a stirrer, a dropping funnel, a nitrogen inlet tube and a reflux condenser, and the inside of the reactor was replaced with nitrogen while stirring. And then, the temperature was raised to 75° C. under a nitrogen atmosphere, and maintained for 60 minutes. Separately, 200 g of acrylic acid and 0.25 g of 2-mercaptoethanol were added to a beaker, followed by mixing using a stirrer for 30 minutes to prepare a monomer composition.

The monomer composition prepared in the above glass reactor and 30 g of 1 wt % aqueous solution of ammonium persulfate were continuously and equally fed over 3 hours, and reacted while maintaining the internal temperature at 80° C. 6 g of acrylic acid and 10 g of a 1 wt % aqueous solution of ammonium persulfate were further added immediately after the completion of the feeding of the monomer composition for 3 hours, and the temperature was maintained at 75° C. for 2 hours. Thereafter, it was cooled down to room temperature to obtain a hydrogel polymer aqueous solution.

The content of residual monomers (unit: ppm) of the hydrogel polymer was measured.

Examples 2 to 9

Polymerization was carried out in the same manner as in Example 1 except that the amount or the time of addition of the further added acrylic acid and aqueous solution of ammonium persulfate was changed, and the content of residual monomers was measured.

Example 10

Polymerization was carried out in the same manner as in Example 1 except that 160 g of acrylic acid and 40 g of methyl acrylate were used to prepare a monomer composition, and the content of residual monomers was measured.

Example 11

Polymerization was carried out in the same manner as in Example 1 except that 160 g of acrylic acid and 40 g of methacrylic acid were used to prepare a monomer composition, and the content of residual monomers was measured.

Examples 12 to 16

Polymerization was carried out in the same manner as in Example 1 except that the amount or the time of addition of the further added acrylic acid and aqueous solution of ammonium persulfate was changed, and the content of residual monomers was measured.

Comparative Example 1

300 g of water was added to a 1 L glass reactor equipped with a thermometer, a stirrer, a dropping funnel, a nitrogen inlet tube and a reflux condenser, and the inside of the reactor was replaced with nitrogen while stirring. And then, the temperature was raised to 75° C. under a nitrogen atmosphere, and maintained for 60 minutes. Separately, 200 g of acrylic acid and 0.25 g of 2-mercaptoethanol were added to a beaker, followed by mixing using a stirrer for 30 minutes to prepare a monomer composition.

The monomer composition prepared in the above glass reactor and 30 g of 1 wt % aqueous solution of ammonium persulfate were continuously and equally fed over 3 hours, and reacted while maintaining the internal temperature at 80° C. After the completion of the feeding of the monomer composition for 3 hours, the temperature was maintained at 75° C. for 2 hours. Thereafter, it was cooled down to room temperature to obtain a hydrogel polymer aqueous solution.

The content of residual monomers (unit: ppm) of the hydrogel polymer was measured.

Comparative Example 2

300 g of water was added to a 1 L glass reactor equipped with a thermometer, a stirrer, a dropping funnel, a nitrogen inlet tube and a reflux condenser, and the inside of the reactor was replaced with nitrogen while stirring. And then, the temperature was raised to 75° C. under a nitrogen atmosphere, and maintained for 60 minutes. Separately, 200 g of acrylic acid and 0.25 g of 2-mercaptoethanol were added to a beaker, followed by mixing using a stirrer for 30 minutes to prepare a monomer composition.

The monomer composition prepared in the above glass reactor and 30 g of 1 wt % aqueous solution of ammonium persulfate were continuously and equally fed over 3 hours, and reacted while maintaining the internal temperature at 80° C. 10 g of a 1 wt % aqueous solution of ammonium persulfate was further added immediately after the completion of the feeding of the monomer composition for 3 hours, the temperature was maintained at 75° C. for 2 hours. Thereafter, it was cooled down to room temperature to obtain a hydrogel polymer aqueous solution.

The content of residual monomers (unit: ppm) of the hydrogel polymer was measured.

Experimental Examples

The processing conditions for the Examples and Comparative Examples, and the content of residual monomers are shown in Table 1 below.

Specifically, the polymers of Examples and Comparative Examples were re-dissolved in an acetonitrile standard solution and analyzed by GC/FID (gas chromatography) to quantify the amount of residual monomers.

TABLE 1

| | The processing conditions | | | | |
|---|---|---|---|---|---|
| | The first monomer* | The second monomer* (parts by weight) | The second polymerization initiator* (parts by weight) | The time of addition* (min) | the content of residual monomers (ppm) |
| Example 1 | AA 200 g | 3 | 0.05 | 0 | 390 |
| Example 2 | AA 200 g | 1 | 0.05 | 0 | 570 |
| Example 3 | AA 200 g | 5 | 0.05 | 0 | 450 |
| Example 4 | AA 200 g | 3 | 0.01 | 0 | 700 |
| Example 5 | AA 200 g | 3 | 0.1 | 0 | 370 |
| Example 6 | AA 200 g | 3 | 0.05 | +1 | 450 |
| Example 7 | AA 200 g | 3 | 0.05 | +3 | 570 |
| Example 8 | AA 200 g | 3 | 0.05 | +5 | 750 |
| Example 9 | AA 200 g | 3 | 0.15 | 0 | 400 |
| Example 10 | AA 160 g, MA 40 g | 3 | 0.05 | 0 | 390 |

TABLE 1-continued

| | The processing conditions | | | |
|---|---|---|---|---|
| | The first monomer* | The second monomer* (parts by weight) | The second polymerization initiator* (parts by weight) | The time of addition* (min) | the content of residual monomers (ppm) |
| Example 11 | AA 160 g, MAA 40 g | 3 | 0.05 | 0 | 380 |
| Example 12 | AA 200 g | 0.5 | 0.05 | 0 | 1,900 |
| Example 13 | AA 200 g | 6 | 0.05 | 0 | 1,700 |
| Example 14 | AA 200 g | 3 | 0.005 | 0 | 2,100 |
| Example 15 | AA 200 g | 3 | 0.05 | +6 | 1,150 |
| Example 16 | AA 200 g | 3 | 0.05 | −3 | 1,200 |
| Comparative Example 1 | AA 200 g | 0 | 0 | — | 17,000 |
| Comparative Example 2 | AA 200 g | 0 | 0.05 | 0 | 5,000 |

(In Table 1, AA refers to acrylic acid, MA refers to methyl methacrylate, and MAA refers to methacrylic acid. The content of the second monomer and the second polymerization initiator is parts by weight based on 100 parts by weight of the first monomer. The point of time at which the addition of the monomer composition including the first monomer is completed was set to 0 as a reference point. And, the time of addition was indicated as − or +, when the second monomer and/or the second polymerization initiator were added before or after the reference point, respectively.)

Referring to the above Table 1, the polymers of the Examples prepared according to the preparation method of the present disclosure had greatly reduced residual monomer content. More specifically, the content of unreacted monomers in Examples 1 to 11 was significantly reduced to about 96 to about 99 wt %, as compared with Comparative Example 1 in which neither the second acrylic acid-based monomer nor the second polymerization initiator was added. In case of Examples 12 to 16 in which the adding conditions were changed, the degree of reduction was smaller than those in Examples 1 to 11, but it also reduced to about 88 to 93 wt %.

In addition, the content of unreacted monomers was reduced to about 85 to about 93 wt % in Examples 1 to 11, and about 58 to about 77 wt % in Examples 12 to 16, as compared with Comparative Example 2 in which only the second polymerization initiator was added without adding the second acrylic acid-based monomer.

What is claimed is:

1. A preparation method for an acrylic acid-based polymer, comprising the steps of:
   polymerizing a monomer composition comprising a first acrylic acid-based monomer and a first polymerization initiator in a polymerization reactor;
   adding a second acrylic acid-based monomer, and a second polymerization initiator into the polymerization reactor in the presence of the polymerized monomer composition; and
   polymerizing the second acrylic acid-based monomer and the polymerized monomer composition to prepare the acrylic acid-based polymer,
   wherein the second polymerization initiator is contained in an amount of 0.01 to 0.2 parts by weight based on 100 parts by weight of the first acrylic acid-based monomer.

2. The preparation method of claim 1, wherein the second acrylic acid-based monomer is contained in an amount of 1 to 10 parts by weight based on 100 parts by weight of the first acrylic acid-based monomer.

3. The preparation method of claim 1, wherein the second acrylic acid-based monomer, and the second polymerization initiator are added into the polymerization reactor within 5 minutes after a feeding of the monomer composition in the polymerization reactor is completed.

4. The preparation method of claim 1, wherein polymerization of the second acrylic acid-based monomer and the polymerized monomer composition is carried out for 1 to 10 hours.

5. The preparation method of claim 1, wherein during the polymerization of the second acrylic acid-based monomer and the polymerized monomer composition, a temperature of 60 to 90° C. is maintained.

6. The preparation method of claim 1, wherein the first and the second acrylic acid-based monomers are the same as or different from each other and each independently comprises at least one selected from the group consisting of acrylic acid, methacrylic acid, methyl methacrylate, and salts thereof.

7. The preparation method of claim 1, wherein the content of residual monomers of the acrylic acid-based polymer is 700 ppm or less.

* * * * *